United States Patent [19]

Lennartz et al.

[11] 4,265,771
[45] May 5, 1981

[54] ALLUVIAL FILTER CANDLE APPARATUS AND A METHOD OF CLEANING THE SAME

[75] Inventors: Rüdiger Lennartz, Pulheim; Ingo Romey, Hünxe, both of Fed. Rep. of Germany

[73] Assignee: Bergwerksverband GmbH, Essen, Fed. Rep. of Germany

[21] Appl. No.: 54,481

[22] Filed: Jul. 2, 1979

[30] Foreign Application Priority Data

Jul. 1, 1978 [DE] Fed. Rep. of Germany ....... 2828976

[51] Int. Cl.³ .............................................. B01D 25/32
[52] U.S. Cl. .................................... 210/769; 210/771; 210/791; 210/323.2
[58] Field of Search ...................................... 210/66-68, 210/79, 331-333 R, 323 T, 345, 416 M, 769, 771

[56] References Cited

U.S. PATENT DOCUMENTS

| 2,744,632 | 5/1956 | Gardes | 210/323 T |
|---|---|---|---|
| 3,042,214 | 7/1962 | Grvanitakis | 210/332 |
| 3,100,190 | 8/1963 | Hobson, Jr. | 210/332 X |
| 3,383,840 | 5/1968 | Johnson et al. | 210/332 |
| 3,482,700 | 12/1969 | Bebech | 210/332 |
| 3,543,933 | 12/1970 | Karter | 210/332 |
| 3,708,072 | 1/1973 | Schmidt, Jr. | 210/332 |
| 3,846,307 | 11/1974 | Petrucci et al. | 210/323 T |
| 4,105,562 | 8/1978 | Kaplan et al. | 210/323 T |
| 4,130,488 | 12/1978 | Speck et al. | 210/323 T |

Primary Examiner—Ivars C. Cintins
Assistant Examiner—E. Rollins Cross
Attorney, Agent, or Firm—Michael J. Striker

[57] ABSTRACT

An alluvial filter candle apparatus has a plurality of filtering elements each of which has a return casing surrounding a riser lower end provided with a filtrate inlet opening and preventing backflow of the filtrate through the filter cake. The volume of the return casing corresponds to that of the riser. The risers are formed as mounting rods which mount candle-like filtering bodies of the filtering elements to a partition subdividing a filter housing into a filtrate chamber and a filtrant chamber. The partition sealingly abuts against and is movable relative to the filter casing. An arrangement is provided for forcedly displacing the partition together with the filtering element so as to separate the filter cake from the latter. A method of cleaning the filtering apparatus is also provided.

22 Claims, 5 Drawing Figures

ALLUVIAL FILTER CANDLE APPARATUS AND A METHOD OF CLEANING THE SAME

BACKGROUND OF THE INVENTION

The present invention relates to an alluvial filter candle apparatus and a method of cleaning the same.

Filter candle apparatuses are known in the art, such as described, for example, in the German Design Pat. No. 6,610,766. They serve for filtering of liquids which contain solid matter, or so called muds, whereas filter residues which form a filter cake are withdrawn in the driest possible condition through a discharge outlet in a bottom of the apparatus. In order to clean the filtering apparatus, an inlet of mud or filtrant is throttled down and simultaneously a pressure gas is injected into a filtrant chamber, so that the main part of the residual filtrant is driven out through candle-like filtering elements. The backflow of a filtrate remaining in risers in the interior of the candle-like filtering elements, through the filter cake and thereby repeated moistening of the latter is prevented by a return valve arranged at the lower end of each riser. Separation of the filter cake is performed by pulsating pressure air which is supplied into the interior of the candle-like filtering elements. The above-described filtering apparatus has several disadvantages. The residual filtrant can be driven by the pressure gas only to the level of the lower edges of the permeable means of the candle-like filtering elements. The remaining considerable residual matter runs out when the discharge opening in the bottom of the filter housing is open. The hindrance of the backflow out of the risers is not reliable, inasmuch as solid particles which remain in the filtrate can deposit between the ball and the ball seat of the return valve so that the latter is no longer tight. During filtering of highly viscous liquids, the return valve can be stuck as a result of cooling of the filter cake in condition of the open discharge outlet. Release or separation of the filter cake from the suspended candle-like filtering elements with the aid of the pressure air medium is possible only for very loose filter cake residues. Sticky filter cake residues formed as a circumferentially closed fixed pipes surrounding the candle-like filtering elements cannot be separated from the latter in the above-disclosed manner.

SUMMARY OF THE INVENTION

Accordingly, it is an object of the present invention to provide a filtering apparatus which has such a simple construction that reliable operation of the apparatus is possible without disturbances for various applications, even in difficult conditions such as filtering of highly viscous liquids, for examples, filtering out of pitch, liquified coal, tar from their ash components.

In keeping with these objects and with others which will become apparent hereinafter, one feature of the present invention resides, briefly stated, in a filtering apparatus in which each filtering element has a return casing surrounding a riser lower end portion having a filtrate inlet opening and preventing backflow of the filtrate through the filter cake which return casing has a volume corresponding to that of the riser, a filtrant inlet of the apparatus is located in the lowest region of a filtrant chamber, the riser of each filtering element is formed as a mounting rod mounting a candle-like filtering body of the filtering element to a partition which subdivides a filter casing into the filtrant chamber and filtrate chamber, the partition sealingly abuts against and is elastically movable relative to the filter housing, and the apparatus is provided with an arrangement for forcedly displacing the partition together with the filtering elements so as to separate the filter cake from the latter.

In the inventive filtering apparatus, the filtrant can be driven back for cleaning purposes by the pressure gas through the filtrant inlet which is located so deep that the waste of expensive liquid such as coal oil remaining in the filter housing is as small as possible.

It is possible to form the risers as mounting rods for mounting the candle-like filtering elements so as to provide for easy mounting and dismounting of the latter. This possibility exists because in accordance with the invention the riser is a simple pipe having only a filtrate inlet opening, without special constructive elements such as closure means, inasmuch as the filtrate backflow is reliably prevented by the return casing. The latter admits such amount of the filtrate which flows back out of the riser, until it rises again into the filtrate chamber during a new operation of the filter apparatus. When the apparatus deals with a filtrate of a viscous liquid which solidifies during discharging of the filter cake as a result of cooling in the return casing, it again liquidies as soon as the wall of the return casing is heated by the filtrant flowing at working temperatures. Since in the inventive apparatus there is no return valve which can be stuck by the solidified filtrate and hinder the rise of the collected residues, the filter apparatus in accordance with the invention operates reliably and without disturbances.

In accordance with another feature of the present invention, the filter housing is provided with a jacket bounding a hollow through which a heating medium flows. This construction is especially suitable for filtering of highly viscous liquids. The thus-constructed apparatus can be utilized as an alluvial filter for filtering out ash components from pitch, liquified coal, tar, bitumens and the like. Thermooil admitted into the interior of the jacket can maintain the working temperatures of the alluvial candle-like filter apparatus at the level of approximately 300° C. (573° K.). In the beginning, filtering aids, such as kieselguhr, settle and deposits on the candle-like filtering elements so as to form, together with filtering residues collected there, a firm tubular filter cake. The filter cake surrounds the candle-like filtering elements and is not easy to be separated from the latter.

When the filter cake formed on the outer surfaces of the candle-like filtering elements becomes rigid, the filtering apparatus must be cleaned. In accordance with the present invention, the filtrate outlet is throttled and after this the pressure gas is admitted into the filtrant chamber, which pressure gas acts both onto the surface of the filtrant and onto the surface of the filtrate between the candle-like filtering bodies and risers of the filtering elements. Thereby, the filtrant is pressed back through the filtrant inlet out of the filtrant chamber, and the filtrate residues are pressed through the risers of the filtering elements into the filtrate chamber. The throttling of the filtrate outlet is so selected that the level of the filtrant in the filtrant chamber and the level of the filtrate in the candle-like filtering elements lower with a substantially equal speed, in order to prevent premature driving out of the filtrate and subsequent blowing out of the pressure gas through the filtrate outlet. After driving out of the filtrant and the filtrate from the filter housing and, in some cases, after further drying of the filter cake by the pressure gas, the arrangement for separating the filter cake from the filtering elements is actuated and a cover of the discharge opening is removed. The filter cake is separated from the filtering elements under the action of shaking, which is facilitated by a conical shape of the filtering elements, and the separated filter cake slides down.

The filter cake which is not very rigid disintegrates in the above-mentioned steps. However, during filtering out of ash components from pitch, tar and the like, a rigid filter cake is formed by kieselguhr and the filter residues. In this case a special comminuting arrangement is required which is provided in accordance with the invention. This comminuting arrangement is formed by a conical wall of the return casings of the filtering elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
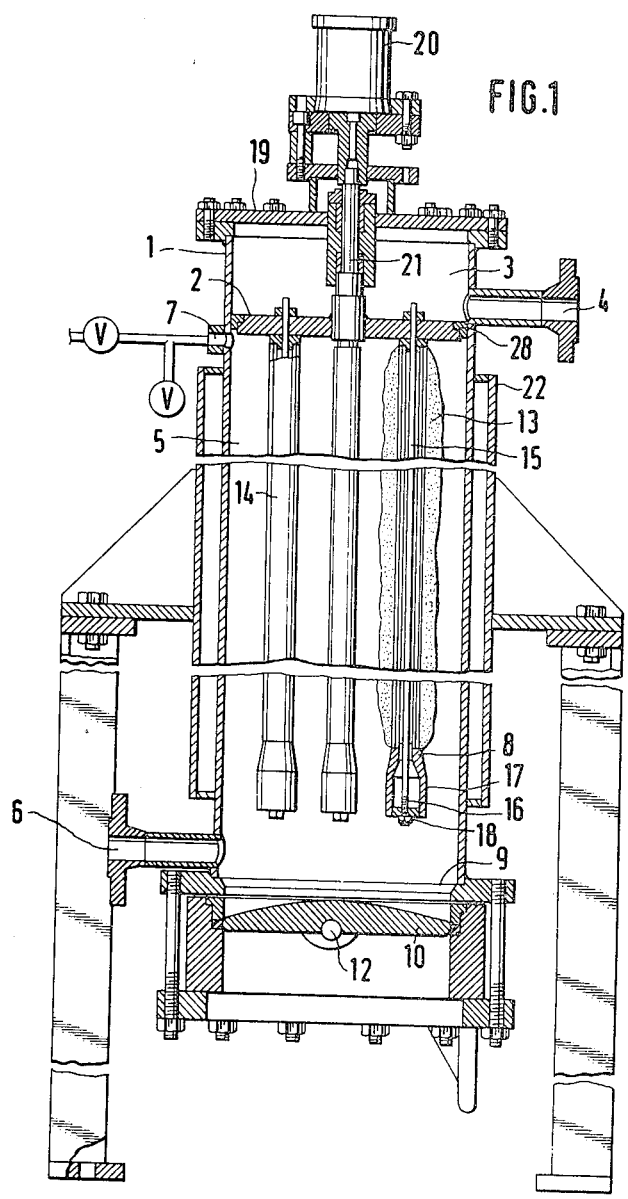
FIG. 1 is a view showing a section of an alluvial candle-like filtering apparatus in accordance with the present invention.

An alluvial candle-like filter apparatus which is shown as an example in the drawing, is utilized for filtering out of solid matters from viscous liquids with operational temperatures of approximately 300° C. (573° K.). The filter apparatus in accordance with the invention can also be utilized, as will be shown hereinafter, for other filtering operations with attaining in highly advantageous results.

Figure 2:
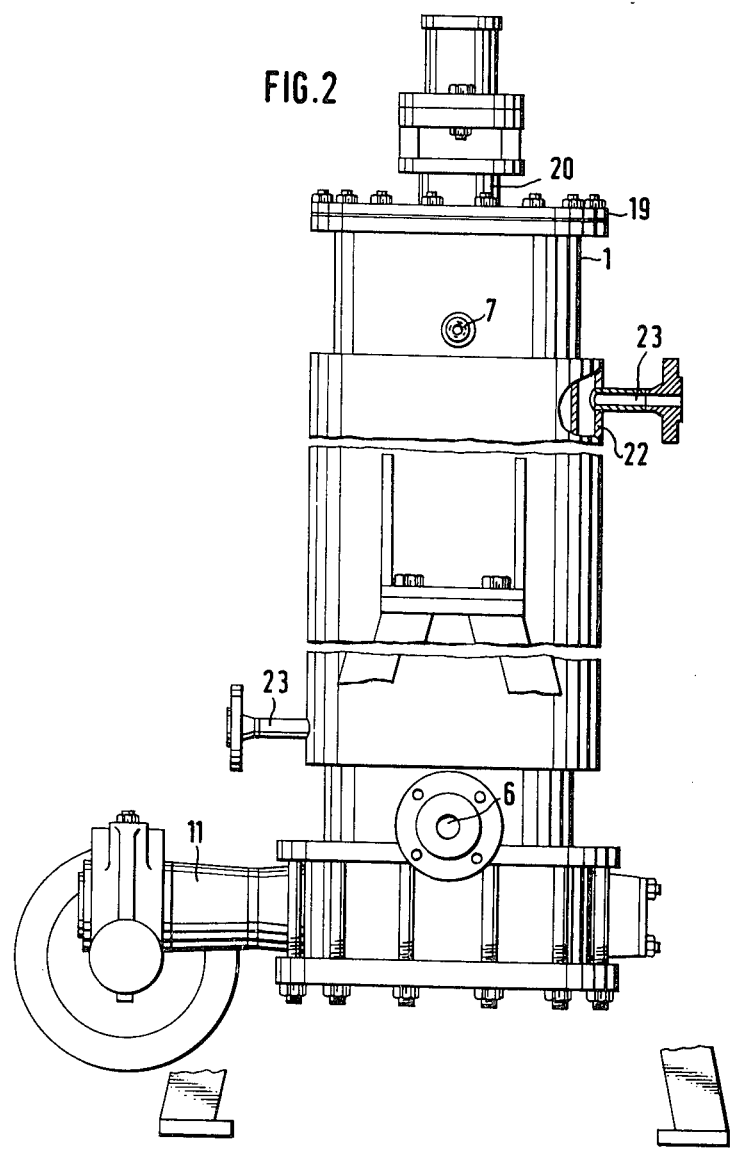
FIG. 2 is a side view of the filtering apparatus shown in FIG. 1.

The alluvial candle-like filter apparatus illustrated in FIGS. 1 and 2 has a filter housing 1 which is subdivided by a horizontal partition 2 into an upper filtrate chamber 3 and a lower filtrant chamber 5. The filtrate chamber 3 has a filtrate outlet 4, whereas the filtrant chamber has a filtrant inlet 6. A pressure gas conduit 7 opens into the filtrant chamber 5 at a small distance below the partition 2.

The filtrant chamber 5 is bounded from below by a bottom provided with a discharge opening 9 which can be closed by a cover 10. In order to discharge filter cake, the discharge opening is opened by turning of the cover 10 about a pivot point 12 into a vertical position, which can be performed by rotary drive 11 shown in FIG. 2.

Filtering candle-like elements or filter candles 14 are suspended on the partition 2. Advantageously this suspension is such that none of the filter candles are located directly above the openable cover 10 in order not to hinder the discharge of the filter cake. Filtering aids and solid particles separated from the filtrant are deposited on an upper surface of the filter candles 14 and form a filter cake 13. A filtrate which has penetrated through the walls into the interior of each filter candle 14 and has been cleaned from the solid matter, rises through a riser 15 arranged in the interior of each filter candle, into the filtrate chamber 3.

The lower end portion of each riser 15 has at least one inlet opening 16 for the filtrate and is advantageously surrounded by a return casing 17. The volume of the return casing 17 is so selected that the entire filtrate collected in the riser 15 can be admitted into the return casing, when the filtrate flows back as a result of interruption of the filtering apparatus operation. Thereby no increased pressure of the subsequently flowing filtrate or of the pressure gas which drives the residual filtrant and the filtrate out of the filter housing, can act at the lower end of the risers 15. The risers 15 must of course be inserted into the filtrate chamber 3 to such extent that no filtrate is located above them. Otherwise, the volume of the return casings 17 must be respectively greater so as to additionally admit the filtrate accumulated above the upper ends of the risers 15.

The risers 15 are formed, in accordance with the present invention, as mounting rods by which the filter candles 14 are mounted on the partition 2. This provides for especially simple mounting and dismounting of the filter candles. Each filter candle 14 is fitted over the riser 15 and its lower end is seated on the return casing 17 which is also fitted over the riser 15. All these parts are held by a nut 18 which is screwed onto an outer thread of the end portion of the riser 15 and abuts against the bottom of the return casing 17. It is understood that the riser 15 is closed at its lower end.

A pneumatically operated knocking arrangement 20 is arranged on a top 19 of the filter housing 1. The knocking arrangement 20 has a plunger 21 which sealingly extends into the filtrate chamber 3. The knocking arrangement 20 operates for delivering impacts against the partition 2 through the plunger 21 with acceleration. At the same time, the partition 2 is held by the plunger 21 and pressed against a seal 22. Thereby, the filter candles 14 are subjected to shaking action. After removal of the filtrant from the filtrant chamber 5, the filter cake 13 can be released in the above-described manner from the filter candles 14 and slide off downwardly. Instead of the knocking arrangement, swinging or shaking arrangements may be provided.

In order to maintain high temperatures in the filter apparatus, which high temperatures are required for filtering of highly viscous liquids, the filter housing 1 is surrounded by a heating jacket 22 at least in the region of the filtrant chamber. A heating medium, such as for example a hot oil, flows in the interior of the jacket, being supplied or withdrawn through conduits 23.

When under the action of shaking of the partition 2 the filter cake is separated from the upper surfaces of the filter candles 14 in form of integral pipes, difficulties are encountered in discharging the filter cake. In order to facilitate the discharge of the filter cake, a comminuting arrangement is provided on the outer surface of the filter candles 14 in the lower region thereof. It is especially advantageous when this cake comminuting arrangement, in accordance with a further inventive feature, is formed as a conical outer wall of the return casing 17. As can be seen from FIG. 1, the return casing 17 has a conical portion 8 which is enlarged toward the lower end and has a cone angle equal to, for example, 5°. Without additional structural elements, the above-mentioned shape of the return housing 17 guarantees that the pipes of the filter cake which are separated from the filter candles by shaking, are expanded and disintegrated into easily dischargeable small pieces. It may be advantageous, under certain conditions, to provide a comminuting arrangement having another construction which is not illustrated in the drawing, such as for example the arrangement including one or several vertically offset blades.

The separation of the filter cake from the filter candles 14 is facilitated when the filter candles are slightly conical so that their lower diameter is smaller than their upper diameter. The magnitude of the diameter differential is of no importance in this case. Even a small conicity of the filter candles is sufficient to guarantee that during the first impact delivered by shaking of the filter candles 14 with the aid of the knocking arrangement 20, the filter cake is separated from the filter candles.

Figure 4:
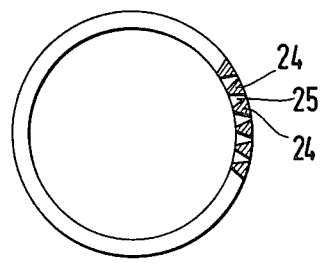
FIG. 4 is a schematic view of a gap-type filtering element of the inventive apparatus with axial orientation of the gaps.
Figure 5:
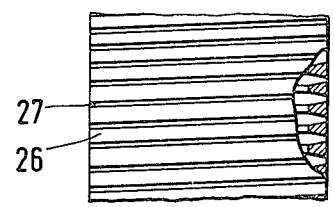
FIG. 5 is a view showing a portion of a gap-type filtering element of the inventive apparatus, with helical orientation of the gaps.

In accordance with the invention, the filter candles 14 are formed advantageously as gap-type filters. Each gap-type filter may be formed from a plurality of upright filter rods 24 with filter gaps 25 therebetween as shown in FIG. 4, or from a shaped wire 26 having a plurality of convolutions and substantially horizontal filter gaps 27 therebetween as shown in FIG. 5. The filter rods and the filter wire is arranged on a frame. In a gap-type filter the resistance to separation of the filter cake is smaller than in other filters, such as those provided, for example, with filtering cloth. The filter cake is especially easily shaken off from the filter candles 14 with the axial gaps 25.

In the gap-type filters with substantially horizontal gaps 27 it is advantageous when the knocking arrangement 20 and the elastic support of the partition 2 are so designed that the axial displaement of the filter candles 14 caused by the shaking is greater than the center distance between the filter gaps 27 in axial direction. Under the action of vibrations of the filter candles 14, performed by the shaking arrangement 20, parts of the filter cake which are accommodated in the filter gaps 27 between the helical convolutions of the shaped wires 26 are sheared off and thereby the filter cake is separated from the filter candles. Advantageously, the axial displacement of the filter candles is equal to substantially from two to four times the axial center distance between the filter gaps 27. In order to provide for the thus-selected impact stroke, the gap widths can be selected within the range from 50 $\mu$m to 600 $\mu$m.

The movement of the partition 2 on which the filter candles are suspended, is attained during operation of the knocking arrangement 20 either by diaphram-like deformation of the partition 2 or by deformation of the seal 28 by which the partition 2 is sealed against the wall of the filter housing 1.

A simple construction for transmission of the impact of the knocking arrangement to the partition 2 is attained when, as shown in FIG. 1, the plunger 21 sealingly extends into the filtrate chamber 3 through the center of the partition 2 and the latter is so pressed against the seal 28 that its sealing action is maintained constantly. The shaking movement of the partition 2 is attained in a simple manner in that the partition 2 is pressed against the seal 28 from below and the seal 28 is so elastic that under the action of the impact of the knocking arrangement 20 it is deformed with the order of magnitude corresponding to the desirable amplitude of the shaking movement. It is advantageous to design the shaking arrangement so that the impact direction of the knocking arrangement 20 is directed toward the partition 2 from below upwards. In such a construction, during the first impact which frequently serves for separating and sliding off of the filter cake, the latter moves downwardly relative to the filter candle whereby the sliding off is accelerated.

Figure 3:
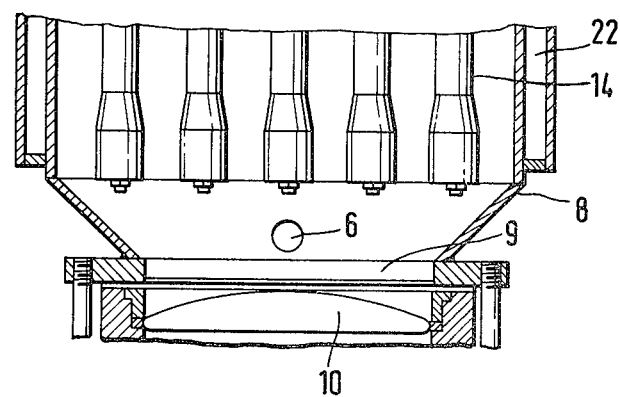
FIG. 3 is a view showing a section of a lower region of the filtering apparatus having greater dimensions.

When the filter apparatus has a great number of the filter candles 14, as shown in FIG. 3, the filter housing 1 is inclined toward the discharge opening in a funnel-like manner. The parts of the filter cake which drop off from the filter candles and are comminuted, slide over the inclined bottom surfaces toward the discharge opening 9 and discharge therethrough. Thereby, it is possible to avoid a large opening 9. A smaller discharge opening is easier to be reliably sealed in operation. Some volume of the residual filtrant which is minimum in the inventive apparatus as compared with the known apparatures, is unavoidable on the construction grounds. This is because the filtrant inlet 6 through which the pressure gas pushes out the filtrant before discharge of the filter cake must be located slightly above the discharge opening.

The alluvial candle-like filter apparatus in accordance with the present invention makes possible an unobjectionable drying of the filter cake, for example with 50% of residual moisture, without disturbances resulting from backflow of the filtrate through the filter cake and without hindrance caused by a great quantity of the residual filtrant which must be first collected when the discharge opening on the bottom of the filter housing is opened. The inventive construction makes possible the utilization of the new filter arrangement as an alluvial filter for filtering highly viscous liquid. The inventive alluvial candle-like filter apparatus has essential advantages as compared with the known candle-like filters with dried discharge of the filter cake, also when the inventive apparatus is utilized in conventional fields. As a result of these advantages, the inventive filtering apparatus can be utilized universally and at the same time is superior to the known apparatuses.

In accordance with the present invention, cleaning of the apparatus is performed in the following manner. The filtrate outlet 4 is throttled whereupon the pressure gas is admitted into the filtrant chamber 5. The pressure gas acts both onto the surface of the filtrant, and onto the surface of the filtrate in the interior of the filter candles 14. The filtrant is pressed back through the filtrant inlet 6 out of the filtrant chamber 5, and the filtrate residues are pressed through the risers 15 into the filtrate chamber 2. The throttling of the filtrate outlet 4 is so selected that the level of the filtrant in the filtrant chamber 5 and the level of the filtrate in the filter candles 14 lower with a substantially equal speed. After driving the filtrate and the filtrant out of the filter housing 1 and, in some cases, after drying of the filter cake by the pressure gas, the arrangement 20 for separating the filter cake 13 from the filter candles 14 is actuated and the cover 10 of the discharge opening 9 is opened. The filter cake 13 is separated from the filter candles 14 under the action of the arrangement 20 and slides down to be withdrawn through the discharge opening 9.

It will be understood that each of the elements described above, or two or more together, may also find a useful application in other types of constuctions differing from the types described above.

While the invention has been illustrated and described as embodied in an alluvial candle-like filter apparatus and a method of cleaning the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An alluvial candle filter apparatus, comprising a housing; a substantially horizontal partition in an upper part of said housing and subdividing the latter into an upper filtrate chamber having a filtrate outlet for discharging a filtrate, and a lower filtrant chamber having a filtrant inlet located in the lowest region of said filtrant chamber and arranged for admitting a filtrant, a pressure gas opening located in the uppermost region of said filtrant chamber and arranged for admitting a pressure gas for expelling residual filtrate and filtrant and drying a filter cake, and a closeable filter cake discharge outlet located in the lowermost region of said filtrant chamber for discharging the filter cake, said partition being sealed against and displaceable relative to said housing; a plurality of filtering element for filtering the filtrant and each having a substantially upright axis and including a filter candle body extending in said filtrant chamber in an axial direction, a riser extending in the interior of said filter candle body in the axial direction and mounting the latter to said partition, said riser having a lower end portion provided with at least one filtrate inlet opening and an upper end portion being open into said filtrate chamber, and a return casing surrounding said lower end portion of said riser and preventing backflow of the filtrate through the filter cake, said return casing having a volume substantially corresponding to that of said riser; and means for releasing the dried filter cake from said filter candle bodies and including an arrangement which is connected with said partition in the upper part of said housing and operative for forcedly displacing the latter together with said filter candle bodies in the axial direction of the latter and with acceleration.

2. A filter apparatus as defined in claim 1, wherein said filter candle bodies have upper ends, said pressure gas opening being located in the region of said upper ends of said filter candle bodies.

3. A filter apparatus as defined in claim 1, wherein said filtering elements have lower ends, said filtrant inlet being located below said lower ends of said filtering elements.

4. A filter apparatus as defined in claim 1; and further comprising means for sealing said partition against said housing and including a sealing member abutting against the latter.

5. A filter apparatus as defined in claim 1, wherein each of said risers is formed as a mounting member which mounts a respective one of said filter bodies to said partition.

6. A filter apparatus as defined in claim 1, wherein said arrangement is operative for displacing said filter bodies with acceleration.

7. A filter apparatus as defined in claim 1, wherein said arrangement is a knocking arrangement.

8. A filter apparatus as defiend in claim 1, wherein said arrangement is a swinging arrangement.

9. A filter apparatus as defined in claim 1, wherein said arrangement is a shaking arrangement.

10. A filter apparatus as defined in claim 10, particularly for filtering highly viscous liquids, wherein said housing has a heated surface at least in the region of said filtrant chamber.

11. A filter apparatus as defined in claim 10, and further comprising means for heating said surface and including a jacket surrounding the same and bounding an inner hollow for accommodating a heating medium.

12. A filter apparatus as defined in claim 1, wherein each of said filter bodies is conical and has a lower end section having a smaller diameter and an upper end section having a greater diameter.

13. A filter apparatus as defined in claim 1, wherein each of said filter bodies is formed as a gap-type filtering member having a plurality of gaps.

14. A filter apparatus as defined in claim 13, wherein said filtering member has an axis and said gaps are spaced from one another in an axial direction of said filtering member, said arrangement being operative for displacing said filtering members by a distance which is from 2 to 4 times greater than the distance between two neighboring gaps of said pluraltiy of gaps.

15. A filter apparatus as defined in claim 4, wherein said partition has a central region, said arrangement having a movable plunger which extends through and connected with said partition and, at the same time, is sealed against said filtrate chamber.

16. A filter apparatus as defined in claim 15, wherein said housing has a wall portion bounding said filtrate chamber, said sealing member abutting against said wall portion, said plunger pressing said partition against said sealing member from below so that the sealing action of the latter is constantly maintained.

17. A filter apparatus as defind in claim 16, wherein said arrangement is operative for displcement of said partition from below in upward direction.

18. A filter apparatus as defined in claim 1, wherein said housing has a lower portion which is inclined toward said discharge outlet in a funnel-shaped manner.

19. A filter apparatus as defined in claim 1, wherein each of said return casings has a conical outer surface which enlarges in a downward direction, so as to form means for comminuting the filter cake.

20. A filter apparatus as defined in claim 1, wherein each of said filter bodies has an outer surface; and further comprising means for comminuting the filter cake and including at least one blade on the outer surface of each of said filter bodies.

21. A method of cleaning an alluvial filter candle apparatus having a housing subdivided into a filtrate chamber with a filtrate outlet, and a filtrant chamber with a filtrant inlet, a pressure gas opening and a filter cake discharge outlet closable by a cover, a plurality of filtering elements each including a filter candle member and a filtrate riser extending in the interior of the latter, and an arrangement for separating a filter cake from the filtering elements by forcedly displacing the latter, the method comprising the steps of throttling the filtrate outlet; and subsequently introducing a pressure gas through the pressure gas opening so as to expel residual filtrant and filtrate from the housing and to dry a filter cake, said throttling step being performed so that the level of the filtrant in the filtrant chamber and the level of the filtrate between the filter members and the risers lower with an equal speed and, after sufficient drying of the filter cake by the pressure gas, the filtrant is withdrawn from the filtrant chamber completely, the cover of the filter cake discharge opening is opened for withdrawing the dried filter cake, and the arrangement is actuated for separating the dried filter cake from the filtering elements.

22. A method as defined in claim 21; and further comprising the step of comminuting the dried filter cake separated from the filtering elements.

* * * * *